(12) United States Patent
Farina

(10) Patent No.: US 6,325,021 B1
(45) Date of Patent: Dec. 4, 2001

(54) AUTOMATIC EQUIPMENT TO WASH, DISINFECT, DRY AND STIMULATE THE DAIRY COW-TEATS

(75) Inventor: Felice Farina, Pugnolo di Cella Dati (IT)

(73) Assignee: C.T.A. S.r.l., Pugnolo di Cella Dati (IT)

( * ) Notice: Subject to any disclaimer, the term of this patent is extended or adjusted under 35 U.S.C. 154(b) by 0 days.

(21) Appl. No.: 09/462,747
(22) PCT Filed: Jul. 13, 1998
(86) PCT No.: PCT/IT98/00194
  § 371 Date: Jan. 13, 2000
  § 102(e) Date: Jan. 13, 2000
(87) PCT Pub. No.: WO99/04623
  PCT Pub. Date: Feb. 4, 1999

(30) Foreign Application Priority Data

Jul. 23, 1997 (IT) .............................................. CR97A0008

(51) Int. Cl.⁷ .................................................. A01K 13/00
(52) U.S. Cl. ........................... 119/664; 119/612; 15/22.1; 15/23
(58) Field of Search ..................... 119/600, 664, 119/14.02, 14.18, 601, 602, 612, 651, 652; 15/22.1, 23

(56) References Cited

U.S. PATENT DOCUMENTS

| | | |
|---|---|---|
| 2,671,926 * | 3/1954 | Minerley . |
| 3,267,903 * | 8/1966 | Valentine . |
| 4,305,346 | 12/1981 | Sparr, Sr. . |
| 4,538,315 * | 9/1985 | Barth ........................................ 15/23 |
| 5,211,132 * | 5/1993 | Farina et al. .......................... 119/664 |
| 5,235,937 * | 8/1993 | Farina et al. .......................... 119/664 |
| 5,383,423 * | 1/1995 | Van der Lely . |
| 6,155,204 * | 12/2000 | van der Lely et al. ............. 119/14.02 |

FOREIGN PATENT DOCUMENTS

| | | |
|---|---|---|
| 0 399 132 | 11/1990 | (EP) . |
| 0 514 765 | 11/1992 | (EP) . |
| 2 559 351 | 8/1985 | (FR) . |
| 08 070726 | 3/1996 | (JP) . |

* cited by examiner

Primary Examiner—Charles T. Jordan
Assistant Examiner—Yvonne R. Abbott
(74) Attorney, Agent, or Firm—Young & Thompson

(57) ABSTRACT

Automatic equipment (1) to wash, disinfect, dry and stimulate the dairy animals'teats and in particular of dairy cows, comprising a washing part (3) supplied with an opening (5) to introduce the teat to be washed, containing two counterrotating brushes at horizontal axis (7a) and (7b) and spray devices (29) for the detergent and sanitizing solution, characterized in that it has a cup-like brush (8), placed below the two counterrotating brushes (7a) and (7b), with a rotation axis perfectly coincident with the entry of the teat in the equipment. To allow the two counterrotating brushes (7a) and (7b) to adjust to the teat conicity which is more accentuated near the udder, they are supplied as well with automatic devices for lateral movement of the rotation axis.

6 Claims, 4 Drawing Sheets

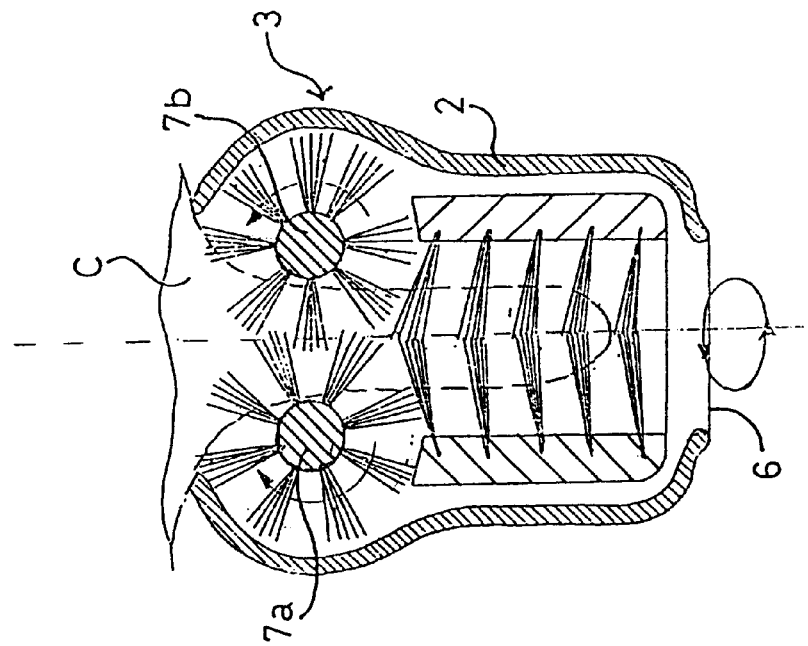
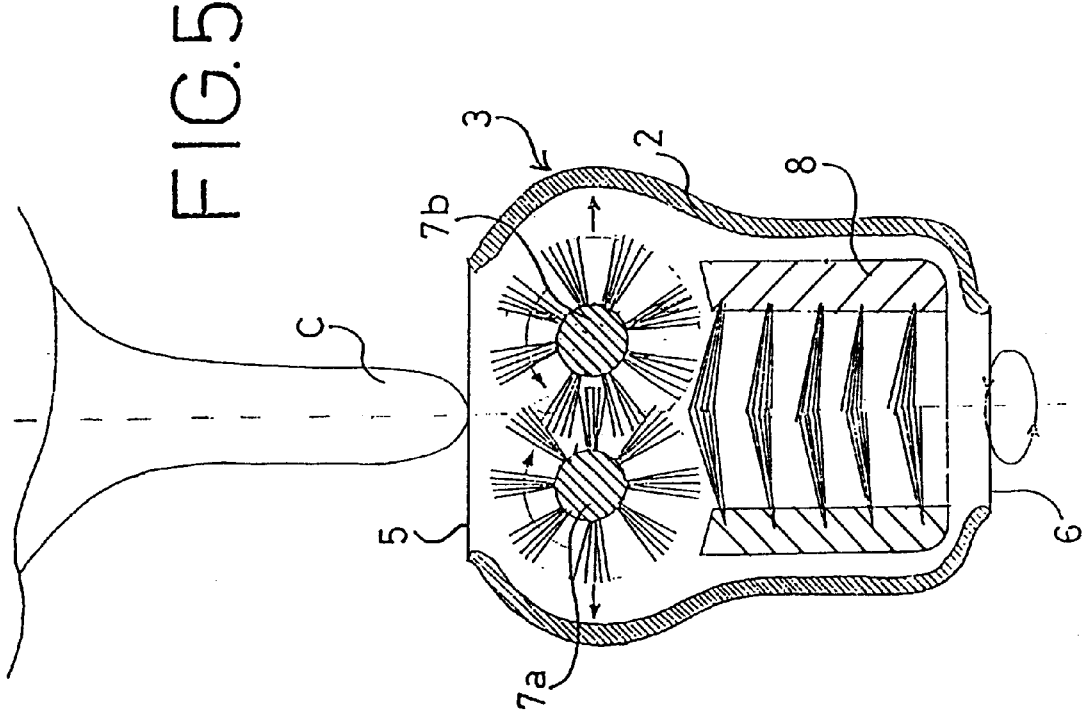

AUTOMATIC EQUIPMENT TO WASH, DISINFECT, DRY AND STIMULATE THE DAIRY COW-TEATS

BACKGROUND OF THE INVENTION

The present invention concerns an equipment which washes, disinfects, dries and stimulates automatically the dairy cow-teats before milking.

In order to assure a greater hygiene and a better quality of milk and allow a following work and seasoning of dairy products, it is necessary to reduce the content of pathogen elements like spores, germs, bacteria etc. which are present in the dairy cow-udders: they stay in the orifice of the teat and enter in contact with milk when it is left out of the udder.

This trend is underlined by recent normatives which on one side take care for the consumers health and on the other side they offer incentives and economical prizes to milk producers who supply a product with high bacteriological characteristics.

In order to cancel the milk contamination it is necessary to make an accurate and complete cleaning of the whole dairycow-teat, from the basis of the udder to the tip of the teat, included the sphynctere. Actually this operation is made through mechanical equipments, apart from doing it manually.

One of these is described in a French patent No. FR 2 559 351, about a device composed of two parallel counterrotating brushes with an horizontal axis, placed in a carrier, near an opening where the teat is sucked in by the rotation effect of the above-mentioned brushes. This system includes as well two holed pipes placed on the side of the brushes to allow water and disinfectant solution to exit and an handling for a manual case.

This equipment has a problem: it does not wash enough the teat because the teat-basis introduction is limited by the distance between the brush-axis; in addition to this it does not allow the washing of the tip of the teat. The teat itself may be completely washed by moving the system up and down, with a rotation on the left and on the right and this causes a great loss of time and the worker is required to pay a lot of attention.

A second equipment is described in the European patent application No. EP 0 399 132-A1.

It concerns an automatic teat-washer for dairy cows, including two counterrotating brushes similar to those of the French patent, which have a sucking action and move the teat against the deviation roller and the third horizontal axis brush, placed under the two other brushes, this third one allows a better cleaning of the tip of the teat. This system is completed by a feeding water-circuit and spray of disinfectant solution and by an handle for the worker, separated from the washing part, with inside a motor and a water flow control device.This equipment, even if it tries to solve the problem of the cleaning of the tip of the teat, is not completely resolutive in fact it may happen that the action of the third brush, when there are long and soft teats, leads the extreme parts of the teat between the deviation roller and the third brush in a position similar to the position of the teat between the two brushes, so that the cleaning action of the tip and of the sphynctere is made by the third brush.

This system does not solve the problem of the teat-basis washing and obliges the worker to make up and down movements to clean all the lateral surface of the teat itself.

A third equipment is known in the Italian patent application No. MI 91A001377.

This equipment consists in a housing with an opening for the teat-introduction inside which are placed two couples of counterrotating brushes placed one upon the other, where the first exercises a sucking action and the second a push to wash the tip of the teat.

A fourth equipment is known from the document U.S. Pat. No. 4,305,346.

This patent discloses a milk "let-down" stimulating apparatus also using, at the same time, as a teat cleaning apparatus.

The apparatus comprises an upwardly opening cup including a lower inlet for upwardly directing spray jets of fluid therein to. The interior of the cup includes radially inwardly projecting bristle-type blades for effecting a scrubbing action on the exterior of an associated teat in response to spray jets of liquid being upwardly directed onto the blades and the associated teat from the cup lower inlet, and the upper axial end of the cup includes a circumferentially extending zone of upwardly projecting flexible blades for contacting the udder area immediately surrounding the associated teat and tactilly stimulating the udder to facilitate quick and complete milk "let-down".

This equipment has the drawback that the teat is only locally scrubbed by the projecting blades caused to oscillate by the spray jets of liquid.

To clean more effectively teats, the apparatus must be moved up and down, since the cup-like brush is fixed in a main body handled by the user.

In correspondence of the opening of the housing, it is active a ring rotating brush, placed on top of these two counterrotating brushes, aiming at cleaning the teat-basis.

On this ring-brush are fixed some bristles extending radially towards the centre of the opening itself, leaving a free passage for the teat. The equipment is able to dry the teat after the washing through a stop of the liquid and through the bristle—rotation prosecution without water.

This equipment, being surely more effective in the washing of the teat-basis, has always some unsolved problems.

In fact the washing of the teat-basis is effective only if you have an exact correspondence between the ring rotating—brush diameter and the teat-basis, then it is important that the worker makes some up and down washing movements.

These movements are more necessary during the drying phase, in order to avoid that the brushes,rotating without water without disinfectant solution and always in the same position, ray cause on the very soft teat skin some abrasions.

A fourth equipment is known from the document U.S. Pat. No. 4,305,346.

This patent discloses a milk "let-down" stimulating apparatus also using, at the same time, as a teat cleaning apparatus.

The apparatus comprises an upwardly opening cup including a lower inlet for upwardly directing spray jets of fluid therinto. The interior of the cup includes radially inwardly projecting bristle-type blades for effecting a scrubbing action on the exterior of an associated teat in response to spray jets of liquid being upwardly directed onto the blades and the associated teat from the cup lower inlet, and the upper axial end of the cup includes a circumferentially extending zone of upwardly projecting flexible blades for contacting the udder area immediately surrounding the associated teat and tactilely stimulating the udder to facilitate quick and complete milk "let-down".

This equipment has the drawback that the teat is only locally scrubbed by the projecting blades caused to oscillate by the spray jets of liquid.

To clean more effectively teats, the apparatus must be moved up and down, since the cup-like brush is fixed in a main body handled by the user.

The aim of the present invention is to avoid the above-mentioned inconvenients.

SUMMARY OF THE INVENTION

In detail the aim is to render available an equipment able to clean perfectly both the tip and the lateral surface, exercising on the teat and on its tip a mechanical lateral action instead of longitudinal, as it happens in the systems known up to now.

A further aim consists in giving to the two counterrotating brushes at horizontal axis, present in the system, not just the sucking function of the teat inside the equipment, but also the function of an effective cleaning of the teat-basis, through a system of automatic adjustment of the brush -wheel base to the dimensions of the part to be cleaned. These aims are reached by the actual invention, as it is characterized in the claims, consisting in an automatic equipment to wash, disinfect, dry and stimulate the dairy animal -teats, in particular the cow-teats; this equipment contains a washing part supplied with an opening for the introduction of the teat to be washed,containing a couple of counterrotaing brushes at horizontal axis and a system to spray detergent and sanitizing solution,characterized by the presence of a cup-like brush, placed below the two counterrotating brushes, with a rotating axis perfectly coincident with the entry of the teat in the equipment.

In order to allow the counterrotating brushes to adjust to the teat conicity which is more accentuated in correspondence with the udder, they are supplied with automatic systems which move the respective rotation-axis.

To allow a perfect washing of the teat inside the two counterrotating brushes and the cup-like brush, as well as the sphynctere, the bristles of the cup-like brush are upwards arranged opposite to the entry of the teat.

You obtain some advantages through this invention such as:

a perfect cleaning of the whole lateral surface and of the tip of the teat included the orifice of the milk exit, independently from the length and size of the teat itself and without doing up and down movements; this equipment can adjust to every size of the teat and of its basis.

DESCRIPTION OF THE PREFERRED EMBODIMENTS

Further characteristics and details of this invention will be better described in the following parts with the Figures showing the best executive method, as an example and not a limitation.

FIGS. 5 and 6 show a crosswise section of the system realized through the teat-introduction direction before and during the washing.

Figure 1:
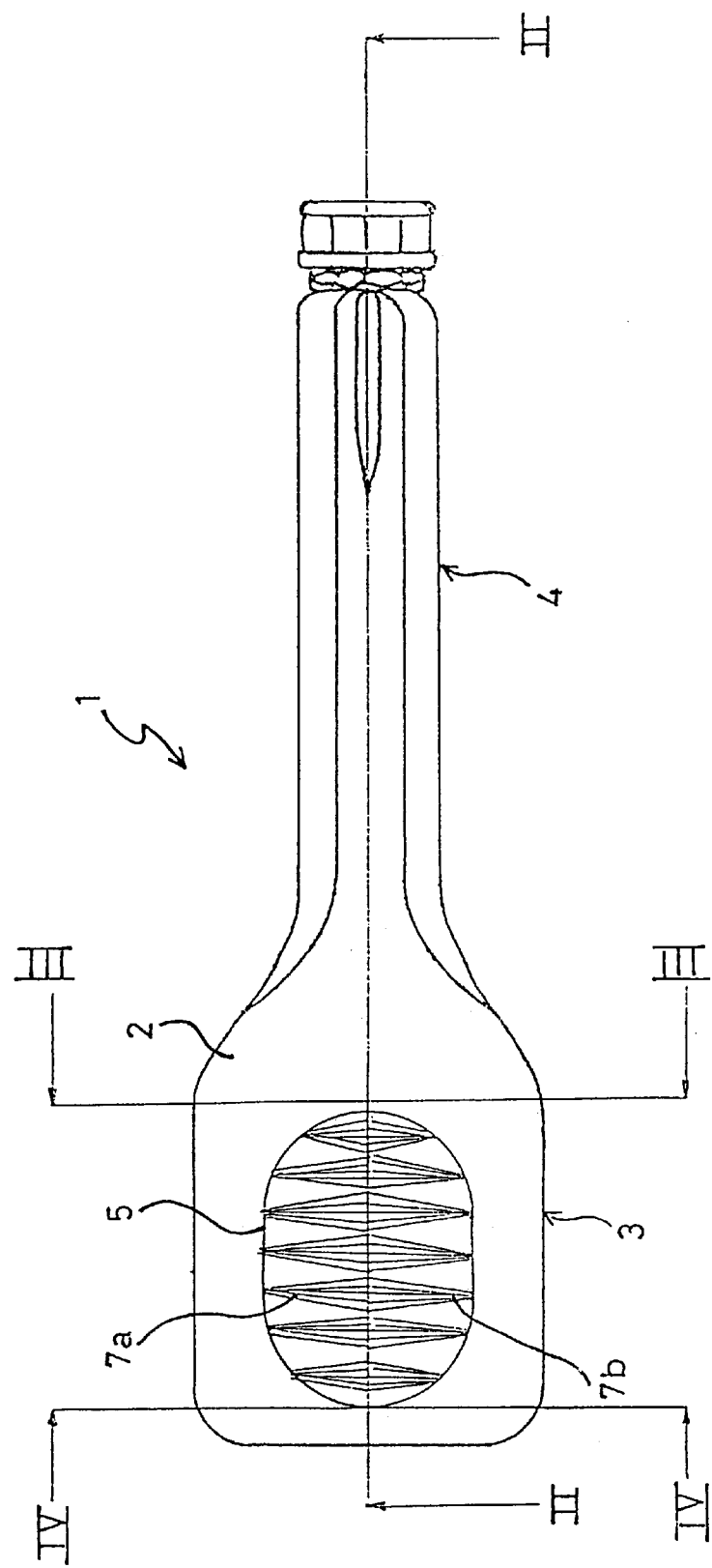
FIG. 1 shows, seen from the top, an equipment realized in conformity to this invention.
Figure 2:
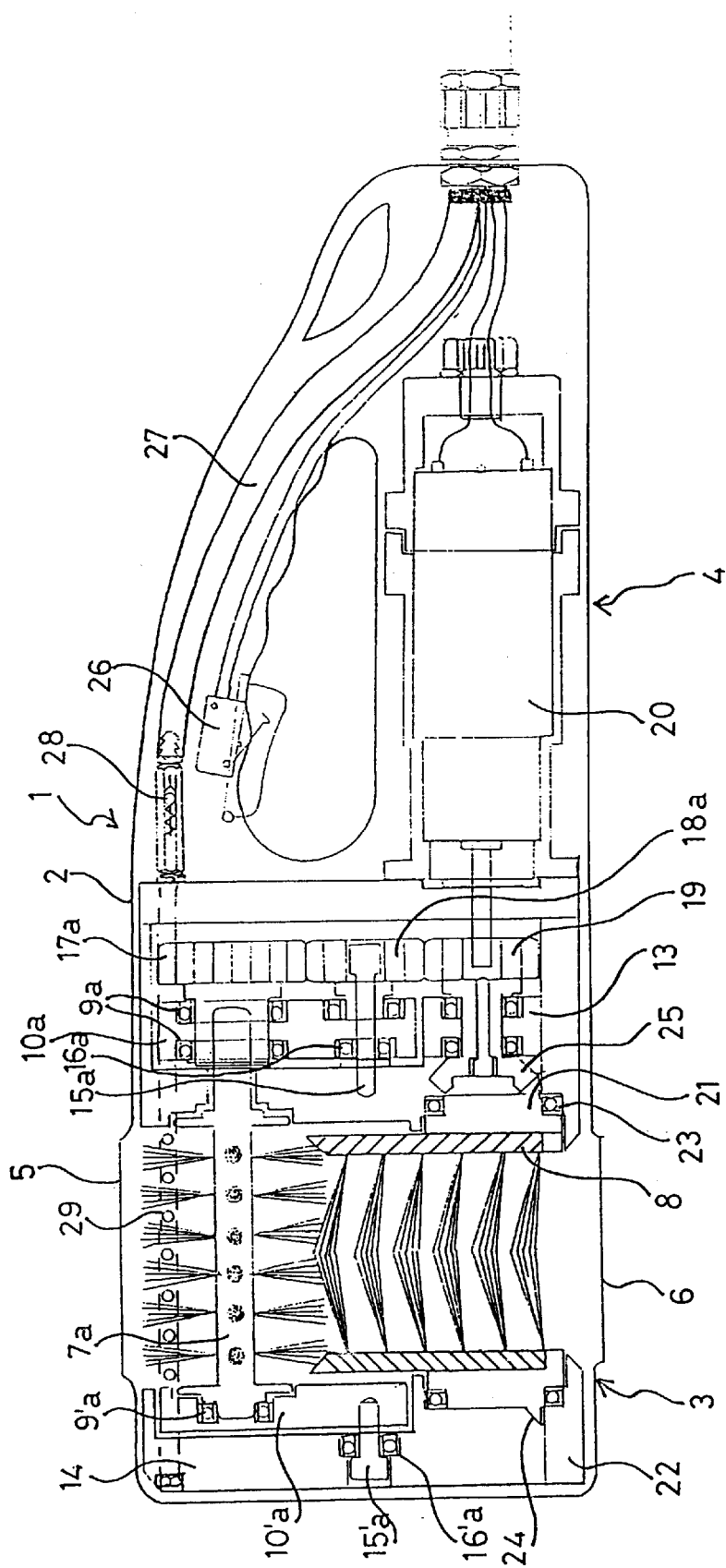
FIG. 2 represents the same equipment, seen according to line II—II of FIG. 1.
Figure 3:
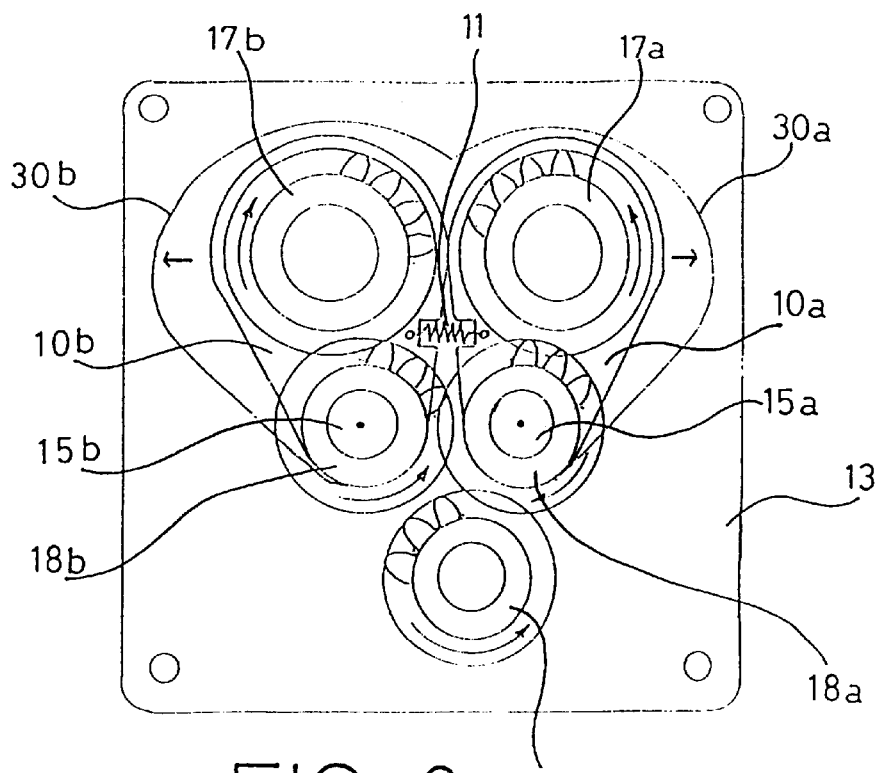
FIGS. 3 and 4 represent the same equipment sectionized crosswise according to lines III—III e IV—IV of FIG. 1.
Figure 4:
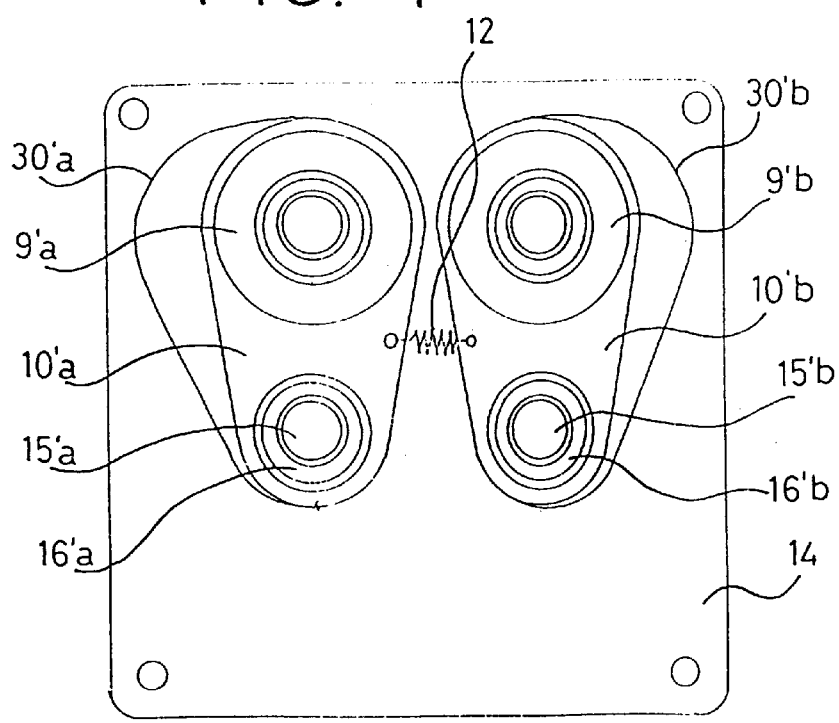

Referring to the details shown in the Figures, the equipment wholly indicated with number. 1, contains essentially an external housing (2) in order to realize in the front part a washing part (3) and in the back part an handling (4).

The washing part (3) is supplied with an upper circular opening (5), through which you can introduce the teat C to be washed, as shown in the FIGS. 5 and 6, and with a lower opening 6 through which the detergent solution can come out after the washing. Inside the washing part 3, just below the opening 5, are installed two counterrotating brushes 7a and 7b with an horizontal axis. The rotation movement of brushes 7a and 7b allows the introduction of the teat C inside the washing part 3, as shown in FIGS. 5 and 6.

Below these brushes 7a and 7b there is a cup-like brush 8 , which turns around a vertical axis perfectly coincident with teat entry-direction inside the equipment 1 as shown in FIGS. 5 and 6. Brushes 7a and 7b are roundly supported, by bearings 9a, 9'a, and 9b, 9'b by rods 10a, 10'a and 10b, 10'b, linked to each other by call back springs 11 and 12.

On their turn these rods 10a, 10b and 10'a, 10'b are roundly linked to shoulder supports 13 and 14 by pins 15a, 15b and 15'a, 15'b which turn through bearings 16a , 16b and 16'a 16'b. Rods 10a, 10b and 10'a, 10'b are free to turn round their relative pins 15a, 15b and 15'a, 15'b inside shaped guides 30a, 30b and 30'a 30'b present on fixed shoulder support 13 and 14.

Gear wheels 17a and 17b are finally forced-fit on these brushes 7a and 7b, outside from the washing part 3.

These gear wheels 17a and 17b are geared by free wheels 18a and 18b, one of them is made turning by a further gear wheel 19 moved by an electrical standard motor 20.

The cup-like brush 8 is supplied with bristles fixed inside its cylindric structure, these bristles are placed radially towards the rotation axis of the brush itself, lightly arranged upwards opposite to the entry of the teat C.

This brush 8 is fixed to a support ring 21, roundly linked to the basic structure 22 of the equipment 1 through bearings 23.

The ring 21 is supplied with a crown wheel 24 which is geared by a conic gear wheel 25, installed on the same axis of the engine gear wheel 19.

The feeding water and the detergent and sanitizing liquid circuit contains a sinusoidal valve placed above the addution pipe, which is not shown in the illustrations, started by the worker with switch 26; a tube 27 inside the handling 4; a valve which does not allow water to return 28 and holed collectors 29 for the exit of the washing liquid. In a variant of such invention, not shown, realized to be applied to an automatic washing system, the equipment may be without handling 4 and the motor parts 20, and the elements relative to the water circuit will be contained in a group next to the washing part 3.

According to the described combinations referring to the present invention, the equipment works as follows.

The switch 26, started by the worker who handles the equipment through the handling 4, provokes the opening of the sinusoidal, placed above the water feeding circuit, and the movement of the motor parts 20.

In this way the detergent liquid starts coming out from the holed 29 and, because of the connection cynetism between the engine gear wheel 19 and the gear wheels 18a, 18b, 17a, 17b, 25 and 24, the counterrotationg brushes 7a and 7b and the cup-like brush 8 start their movement.

When the worker places the opening 5 of the equipment under the teat C to be washed, this one is sucked inside the washing part 3 thanks to the action of brushes 7a and 7b.

The brushes 7a and 7b start the longitudinal teat-washing and, thanks to the lateral movement of both the rotation axis, characterized by rods 10 a, 10b and 10 'a, 10 'b linked by the call back springs 11 and 12, these brushes remove allowing the total entry of the teat C inside the washing part 3 and the teat-basis washing.

Below the brushes 7a and 7b, the cup-like brush works and permits the complete lateral washing of the teat C and the cleaning of the tip of the teat, included the sphynctere, thanks to the upward arrangement of the bristles opposite to the entry of the teat.

The cleaning action is completed by the drying which starts when the worker leaves the button 26, thanks to a device which closes the sinusoidal valve of the water circuit and to a control of the stop delay of the motor parts 20.

The functioning without water of the equipment is useful also for the stimulation of the teat before milking.

What is claimed is:

1. Automatic equipment to wash, disinfect, dry and stimulate the teat of a dairy animal, comprising in an external housing a handling part and a washing part supplied with an opening for the introduction of the teat to be washed, containing two counterrotating brushes on horizontal axes and spray devices of a sanitizing and detergent water solution; and a cup-like brush, placed below these two counterrotating brushes and having a rotation axis coincident with the entry direction of the teat inside the equipment.

2. Automatic equipment according to claim 1, wherein said counterrotating brushes are supplied with automatic devices which permit lateral movement of the rotation axes.

3. Automatic equipment according to claim 2, wherein said automatic devices comprise two couples of rods, which freely move inside shaped guides, these rods having first turning extremities linked to a fixed support through pins and second turning extremities linked to the rotation axes of the counterrotating brushes.

4. Automatic equipment according to claim 3, wherein said rods are linked by call-back elastic elements.

5. Automatic equipment to wash, disinfect, dry and stimulate the teat of a dairy animal, comprising in an external housing a handling part and a washing part supplied with an opening for the introduction of the teat to be washed, containing two counterrotating brushes on horizontal axes and spray devices of a sanitizing and detergent water solution; and a cup-like brush, placed below these two counterrotating brushes and having a rotation axis coincident with the entry direction of the teat inside the equipment, wherein bristles of the cup-like brush, which extend radially from the internal surface of the cup-like brush towards the rotation axis, are lightly upward arranged, opposite to the entry of the teat.

6. Automatic equipment to wash, disinfect, dry and stimulate the teat of a dairy animal, comprising in an external housing a handling part and a washing part supplied with an opening for the introduction of the teat to be washed, containing two counterrotating brushes on horizontal axes and spray devices of a sanitizing and detergent water solution; and a cup-like brush, placed below these two counterrotating brushes and having a rotation axis coincident with the entry direction of the teat inside the equipment, wherein said brush is fixed by a support ring of the equipment, roundly linked to the basis-structure of the. equipment through bearings, supplied with a wheel crown, geared by a gear wheel installed on the same axis as an engine gear wheel.

* * * * *